United States Patent
Saito

(10) Patent No.: US 10,659,603 B2
(45) Date of Patent: *May 19, 2020

(54) COMMUNICATION APPARATUS AND COMMUNICATION METHOD

(71) Applicant: NEC CORPORATION, Tokyo (JP)

(72) Inventor: Kaichiro Saito, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,540

(22) Filed: May 7, 2018

(65) Prior Publication Data

US 2018/0332166 A1 Nov. 15, 2018

Related U.S. Application Data

(63) Continuation of application No. 13/320,136, filed as application No. PCT/JP2010/003560 on May 27, 2010, now Pat. No. 9,998,591.

(30) Foreign Application Priority Data

May 27, 2009 (JP) ................................ 2009-127527

(51) Int. Cl.
*H04L 29/06* (2006.01)
*H04M 3/42* (2006.01)
(Continued)

(52) U.S. Cl.
CPC ........ *H04M 3/42144* (2013.01); *G06Q 10/00* (2013.01); *G06Q 10/063* (2013.01);
(Continued)

(58) Field of Classification Search
CPC ............... H04M 3/42144; H04M 3/38; H04M 2203/358; H04M 2203/053; G06Q 10/00; G06Q 10/063

See application file for complete search history.

(56) References Cited

U.S. PATENT DOCUMENTS 3,920,936 A * 11/1975 Mogtader ............. H04M 1/677
 379/131
5,365,570 A * 11/1994 Boubelik ............. H04M 1/677
 455/565
(Continued)

FOREIGN PATENT DOCUMENTS

| CN | 1735851 A | 2/2006 |
| CN | 100380273 C | 4/2008 |

(Continued)

OTHER PUBLICATIONS

Chinese Notice of Allowance for CN Application No. 201080021452.8 dated Jul. 2, 2015 with English Translation English Translation.

(Continued)

*Primary Examiner* — John B King
(74) *Attorney, Agent, or Firm* — Sughrue Mion, PLLC

(57) ABSTRACT

A communication apparatus includes a user signal transmission unit that transmits a user signal required for an end user to perform communication; a manager function implementing unit that implements a function provided to a manager of the present apparatus; a license monitoring unit that monitors a license of the present apparatus, and outputs a function limitation signal when the license has expired; and a function limitation unit that limits the function implemented by the manager function implementing unit when receiving the function limitation signal. In a communication apparatus that transmits a user signal required for an end user to perform communication, a function of the apparatus is limited when a relevant license has expired, while preventing an influence of the limitation upon the end user.

6 Claims, 4 Drawing Sheets

(51) Int. Cl.
H04M 3/38 (2006.01)
G06Q 10/00 (2012.01)
G06Q 10/06 (2012.01)

(52) U.S. Cl.
CPC ........ *H04M 3/38* (2013.01); *H04M 2203/053* (2013.01); *H04M 2203/358* (2013.01)

(56) References Cited

U.S. PATENT DOCUMENTS

| | | | |
|---|---|---|---|
| 6,023,766 A | | 2/2000 | Yamamura |
| 7,457,781 B1* | | 11/2008 | Weaver ................ G06Q 20/367 |
| | | | 455/405 |
| 7,593,000 B1 | | 9/2009 | Chin |
| 7,715,818 B2 | | 5/2010 | Sato |
| 7,949,607 B2 | | 5/2011 | Ito |
| 8,103,594 B2* | | 1/2012 | Sakagawa ............ G06Q 20/382 |
| | | | 705/51 |
| 8,713,698 B2* | | 4/2014 | Adachi ................ G06F 21/121 |
| | | | 705/51 |
| 2002/0002466 A1 | | 1/2002 | Kambayashi et al. |
| 2002/0029347 A1 | | 3/2002 | Edelman |
| 2003/0140009 A1 | | 7/2003 | Namba et al. |
| 2004/0249815 A1 | | 12/2004 | Lee |
| 2005/0075136 A1* | | 4/2005 | Cromer .................... H01Q 1/22 |
| | | | 455/558 |
| 2005/0091312 A1 | | 4/2005 | Kuriya |
| 2005/0144140 A1 | | 6/2005 | Nagao |
| 2006/0021012 A1 | | 1/2006 | Ito |
| 2006/0052134 A1 | | 3/2006 | Sato |
| 2006/0200420 A1 | | 9/2006 | Osada |
| 2007/0179752 A1 | | 8/2007 | Tonouchi et al. |
| 2007/0288386 A1* | | 12/2007 | Adachi ................... G06F 21/10 |
| | | | 705/58 |
| 2008/0200142 A1 | | 8/2008 | Abdel-Kader et al. |
| 2008/0209569 A1 | | 8/2008 | Araki |
| 2008/0222021 A1 | | 9/2008 | Stanforth et al. |
| 2008/0300887 A1 | | 12/2008 | Chen et al. |
| 2009/0055252 A1 | | 2/2009 | Samuel |
| 2009/0119779 A1 | | 5/2009 | Dean et al. |
| 2009/0133127 A1 | | 5/2009 | Adachi |
| 2009/0165083 A1* | | 6/2009 | McLean ................ G06F 21/10 |
| | | | 726/1 |
| 2009/0276269 A1 | | 11/2009 | Yee et al. |
| 2010/0293536 A1 | | 11/2010 | Nikitin et al. |

FOREIGN PATENT DOCUMENTS

| | | |
|---|---|---|
| EP | 1 638 303 A1 | 3/2006 |
| JP | 2001128237 A | 5/2001 |
| JP | 2005128960 A | 5/2005 |
| JP | 2007006163 A | 1/2007 |

OTHER PUBLICATIONS

The Extended European Search Report for EP Application No. 10780286.0 dated Apr. 8, 2014.
Chinese Office Action for CN Application No. 201080021452.8 dated Nov. 19, 2013 with English Translation English Translation.
International Search Report for PCT/JP2010/003560 dated Aug. 31, 2010.
Communication dated May 28, 2019 from European Patent Office in counterpart EP Application No. 19157641.2.
Communication dated Mar. 19, 2020 by the United States Patent and Trademark Office in U.S. Appl. No. 16/291,158.

* cited by examiner

COMMUNICATION APPARATUS AND COMMUNICATION METHOD

CROSS REFERENCE TO RELATED APPLICATIONS

This application is a Continuation application of U.S. application Ser. No. 13/320,136 filed Nov. 11, 2011, which is a National Stage Entry of International Application No. PCT/JP2010/003560 filed May 27, 2010, which claims priority from Japanese Patent Application No. 2009-127527 filed May 27, 2009, the contents of all of the prior applications are incorporated herein by reference in their entireties.

TECHNICAL FIELD

The present invention relates to a communication apparatus that transmits a user signal required for an end user to perform communication, and a corresponding communication method.

BACKGROUND ART

A technique for limiting the use period of a product has been proposed so as to perform charging based on a license relating to the use period of the product.

For example, in a technique disclosed in Patent Document 1, when a reproduction instruction for contents is issued, the client receives a server time TT from a server through a network, and stores the received server time TT into a storage module. When the license of the contents to be reproduced has a time limitation, the evaluation of the license is performed based on the stored server time TT, thereby preventing an unauthorized reproduction of contents limited in the reproduction period.

PRIOR ART DOCUMENT

Patent Document

Patent Document 1: Japanese Unexamined Patent Application, First Publication No. 2005-128960.

DISCLOSURE OF INVENTION

Problem to be Solved by the Invention

However, if the above-described conventional technique is applied to a communication apparatus, which transmits a user signal required for an end user to perform communication, so as to limit the use period of the apparatus, then an entrepreneur who should update the license of the apparatus performs no updating and the communication apparatus can not work. Such a case affects, not only the entrepreneur, but also the end user who wants to perform communication.

In light of the above circumstances, an object of the present invention is to provide a communication apparatus that transmits a user signal required for an end user to perform communication, and a corresponding communication method, so as to make it possible to limit a function of the apparatus when a relevant license has expired, while preventing an influence of the limitation upon the end user.

Means for Solving the Problem

A mode of the present invention is a communication apparatus comprising:

a user signal transmission unit that transmits a user signal required for an end user to perform communication;

a manager function implementing unit that implements a function provided to a manager of the present apparatus;

a license monitoring unit that monitors a license of the present apparatus, and outputs a function limitation signal when the license has expired; and a function limitation unit that limits the function implemented by the manager function implementing unit when receiving the function limitation signal.

Another mode of the present invention is a communication method comprising:

a user signal transmission step, performed by a communication apparatus, that transmits a user signal required for an end user to perform communication;

a manager function implementing step, performed by the communication apparatus, that implements a function provided to a manager of the present apparatus;

a license monitoring step, performed by the communication apparatus, that monitors a license of the present apparatus, and outputs a function limitation signal when the license has expired; and a function limitation step, performed by the communication apparatus, that limits the function, which is implemented in the manager function implementing step, in accordance with the function limitation signal.

Another mode of the present invention is a program that makes a computer execute:

a user signal transmission step that transmits a user signal required for an end user to perform communication;

a manager function implementing step that implements a function provided to a manager of the present apparatus;

a license monitoring step that monitors a license of the present apparatus, and outputs a function limitation signal when the license has expired; and a function limitation step that limits the function, which is implemented in the manager function implementing step, in accordance with the function limitation signal.

Effect of the Invention

In accordance with the present invention relating to a communication apparatus that transmits a user signal required for an end user to perform communication, it is possible to limit a function of the apparatus when a relevant license has expired, while preventing an influence of the limitation upon the end user.

MODE FOR CARRYING OUT THE INVENTION

Figure 1:
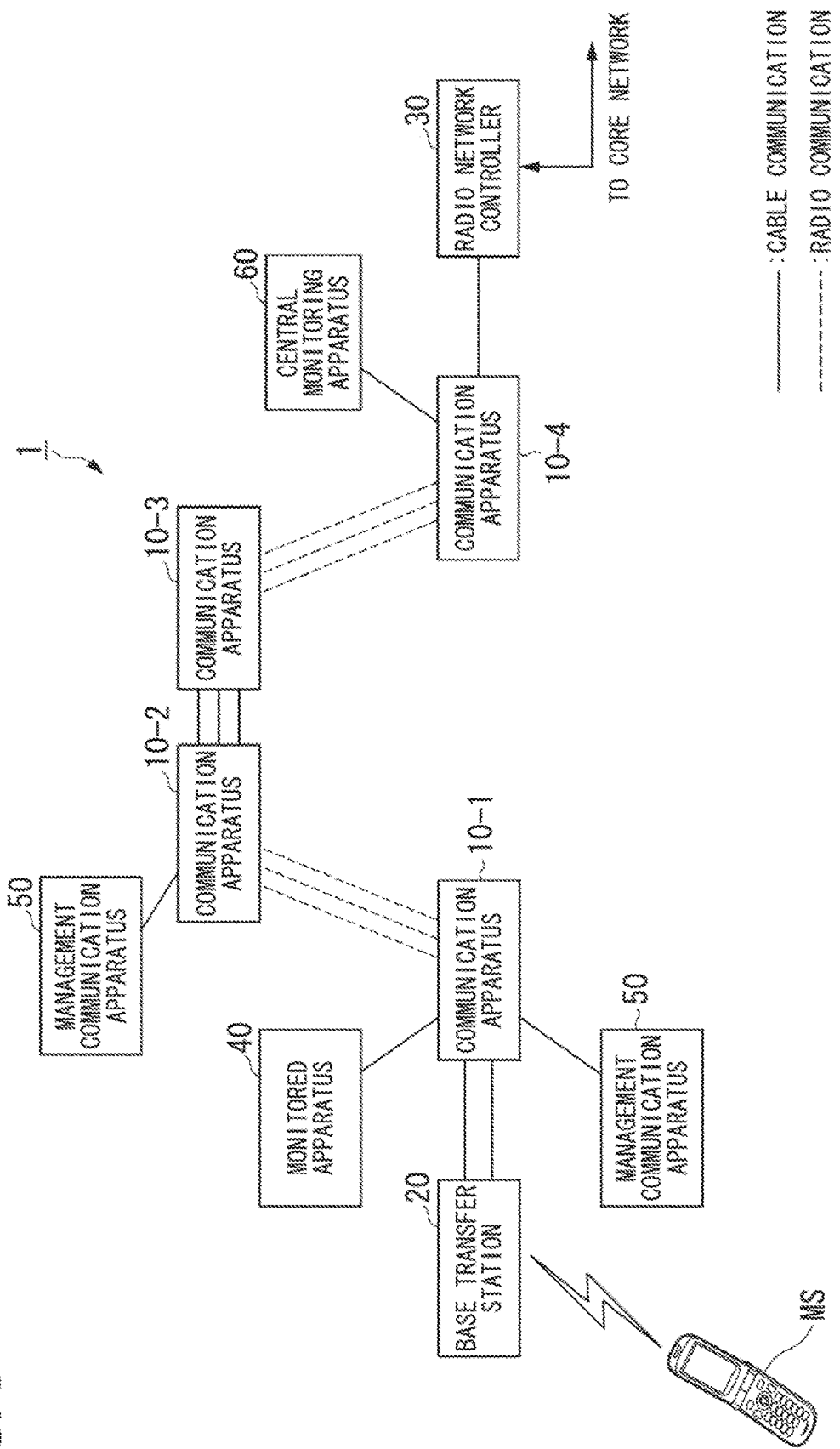
FIG. 1 is a diagram showing the system configuration of a base station communication system.

FIG. 1 is a diagram showing the system configuration of a base station communication system 1.

The base station communication system 1 includes a communication apparatus 10 (communication apparatuses 10-1 to 10-4 are collectively called the communication apparatuses 10), a base transfer station 20, a radio network controller 30, a monitored apparatus 40, management communication apparatuses 50, and a central monitoring apparatus 60. The base station communication system 1 functions as a radio access network which is a part of a mobile communication system.

A plurality of communication apparatuses 10 are provided between the base transfer station 20 and the radio network controller 30. A user line, a management line, and a network monitoring line are provided between adjacent communication apparatuses 10. Accordingly, the communication apparatuses 10 function as relay apparatuses so as to form a communication path between the base transfer station 20 and the radio network controller 30. The structures of the base transfer station 20 and the communication apparatuses 10 will be explained in detail.

The user line is provided for transmitting a signal (user signal) which may be a signal sent from or to a mobile station apparatus MS or a control signal for communication between the base transfer station 20 and another apparatus (e.g., another base transfer station 20 or the radio network controller 30).

If the user line is disconnected, the base transfer station 20 cannot perform communication, and subsequently telephone and data communication using the mobile station apparatus MS cannot be performed.

The management line is provided for transmitting a signal (management signal) for telephone and data communication, where an entrepreneur who manages the mobile communication system or the base station communication system 1 uses the signal for managing the system.

The management signal may be a speech signal in telephone communication processing or a signal for data communication between the management communication apparatuses 50. If the management line is disconnected, the management communication apparatuses 50, who have performed telephone or data communication via the disconnected part, cannot perform the telephone or data communication.

The network monitoring line is provided for transmitting a signal (network monitoring signal) which is used for monitoring and controlling the entire system by using an NMS (Network Management System) or the like.

The network monitoring signal may be a signal that indicates monitoring information about each communication apparatus 10, the base transfer station 20, or the monitored apparatus 40, or a control signal used by the central monitoring apparatus 60 to control each apparatus 10, the base transfer station 20, or the monitored apparatus 40.

If the network monitoring line is disconnected, monitoring information about each apparatus present between the disconnected point and the base transfer station 20 does not reach each communication apparatus 10 and the central monitoring apparatus 60 present between the disconnected point and the radio network controller 30.

The base transfer station 20 is provided at an end of the mobile communication system, and communicates with the mobile station apparatus MS by means of radio communication. The base transfer station 20 also communicates with the radio network controller 30 via the communication apparatus 10 connected to itself (i.e., communication apparatus 10-1 in FIG. 1) and other communication apparatuses 10 (i.e., communication apparatus 10-2 to 10-4 in FIG. 1) through the user line.

The radio network controller 30 is provided at a boundary between the radio access network and a core network in the mobile communication system. The radio network controller 30 communicates with the base transfer station 20 via the communication apparatus 10 connected to itself (i.e., communication apparatus 10-4 in FIG. 1) and other communication apparatuses 10 (i.e., communication apparatus 10-1 to 10-3 in FIG. 1) through the user line.

The monitored apparatus 40 is an electronic apparatus monitored by the communication apparatus 10 or the central monitoring apparatus 60, and may be a power supply management apparatus, a security management apparatus, or a reference clock management apparatus. The monitored apparatus 40 sends the relevant communication apparatus 10 a signal which indicates monitoring information, and receives a control signal from the communication apparatus 10 so as to update its settings in accordance with the control signal.

The management communication apparatus 50 is connected to the communication apparatus 10 so as to communicate with another management communication apparatus 50 via the management line. The management communication apparatus 50 is used as a terminal apparatus for telephone or data communication performed by an entrepreneur who manages the mobile communication system or the base station communication system 1, so as to manage the relevant system.

The central monitoring apparatus 60 is an information processing apparatus used for monitoring the state of each apparatus provided in the base station communication system 1. The central monitoring apparatus 60 receives monitoring information from each apparatus provided in the base station communication system 1 via the network monitoring line, and monitors whether or not an abnormal state has occurred in each apparatus in accordance with a determination criterion which is predetermined. When an abnormal state has occurred, the central monitoring apparatus 60 displays information which indicates that an abnormal state has occurred and information relating to the abnormal state, so as to inform a monitor (i.e., the user of the central monitoring apparatus 60) of the occurrence of the abnormal state.

Additionally, in accordance with a presetting or an operation by the monitor, the central monitoring apparatus 60 sends each apparatus provided in the base station communication system 1 a control signal used for updating the settings of each apparatus via the network monitoring line.

The target apparatus for the monitoring by the central monitoring apparatus 60 may be the communication apparatus 10, the base transfer station 20, or the monitored apparatus 40.

Figure 2:
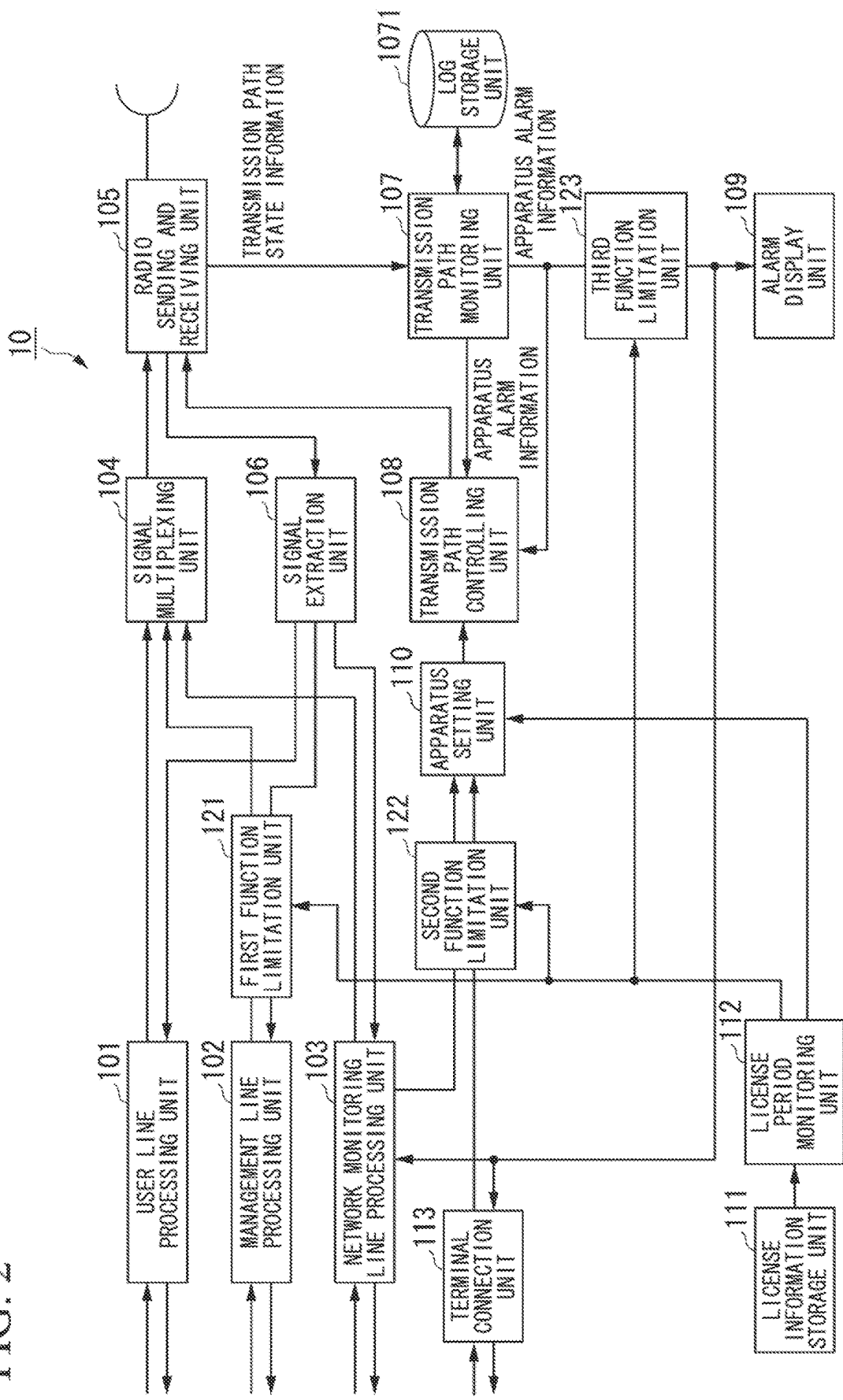
FIG. 2 is a general block diagram showing the functional structure of a communication apparatus as an embodiment of the present invention.

FIG. 2 is a general block diagram showing the functional structure of each communication apparatus 10.

The communication apparatus 10 has a CPU (Central Processing Unit), a memory, and an auxiliary storage unit, which are connected to each other via buses, and functions as an apparatus having the following unites by executing a communication program: a user line processing unit 101, a management line processing unit 102, a network monitoring line processing unit 103, a signal multiplexing unit 104, a radio sending and receiving unit 105, a signal extraction unit 106, a transmission path monitoring unit 107, a transmission path controlling unit 108, an alarm display unit 109, an apparatus setting unit 110, a license information storage unit 111, a license period monitoring unit 112, a terminal connection unit 113, a first function limitation unit 121, a second function limitation unit 122, and a third function limitation unit 123.

All or part of each function of the communication apparatus 10 may be implemented using a hardware resource such as ASIC (Application Specific Integrated Circuit) or PLD (Programmable Logic Device).

The user line processing unit 101 performs signal processing used for communication (transmission and reception) of a user signal with another apparatus.

For example, the user line processing unit 101 of the communication apparatus 10-1 (i) receives a user signal from the base transfer station 20 and outputs it to the signal multiplexing unit 104, and (ii) receives a user signal extracted by the signal extraction unit 106 and outputs it to the base transfer station 20.

The user line processing unit 101 of the communication apparatus 10-2 (i) receives a user signal extracted by the signal extraction unit 106 and outputs it to the user line processing unit 101 of the communication apparatus 10-3, and (ii) receives a user signal from the user line processing unit 101 of the communication apparatus 10-3 and outputs it to the signal multiplexing unit 104.

The user line processing unit 101 of the communication apparatus 10-3 (i) receives a user signal extracted by the signal extraction unit 106 and outputs it to the user line processing unit 101 of the communication apparatus 10-2, and (ii) receives a user signal from the user line processing unit 101 of the communication apparatus 10-2 and outputs it to the signal multiplexing unit 104.

The user line processing unit 101 of the communication apparatus 10-4 (i) receives a user signal from the radio network controller 30 and outputs it to the signal multiplexing unit 104, and (ii) receives a user signal extracted by the signal extraction unit 106 and outputs it to the radio network controller 30.

The management line processing unit 102 performs signal processing used for communication (transmission and reception) of a management signal with another apparatus.

For example, the management line processing unit 102 of the communication apparatuses 10-1 and 10-2) (i) receives a management signal from the management communication apparatus 50 and outputs it via the first function limitation unit 121 to the signal multiplexing unit 104, and (ii) receives a management signal extracted by the signal extraction unit 106 via the first function limitation unit 121 and outputs the received signal to the management communication apparatus 50.

The network monitoring line processing unit 103 performs signal processing used for communication (transmission and reception) of a network monitoring signal with another apparatus.

For example, the network monitoring line processing unit 103 of the communication apparatus 10-1 has the following functions.

(i) It receives monitoring information (i.e., an external NMS signal) from each of the base transfer station 20 and the monitored apparatus 40 and outputs the information as the network monitoring signal to the signal multiplexing unit 104.

(ii) It receives apparatus alarm information via the third function limitation unit 123 from the transmission path monitoring unit 107 and outputs the information as monitoring information for the present apparatus to the signal multiplexing unit 104.

(iii) It detects in a network monitoring signal extracted by the 106, a control signal addressed to another apparatus (the base transfer station 20 or the monitored apparatus 40) connected to the present apparatus, and outputs the control signal to each apparatus as an addressee thereof.

The signal multiplexing unit 104 multiplexes the signals received from the user line processing unit 101, the management line processing unit 102, and the network monitoring line processing unit 103 into a radio signal to be output to the radio sending and receiving unit 105.

The signal multiplexing unit 104 may employ any multiplexing method such as time-division multiplexing, frequency-division multiplexing, or wavelength-division multiplexing.

The radio sending and receiving unit 105 performs communication with another communication apparatus 10. Specifically, the radio sending and receiving unit 105 has the following functions.

(i) It outputs the multiplexed transmission signal to a radio transmission path, so as to send the signal to another communication apparatus 10.

(ii) It outputs a radio signal, which has been received from another communication apparatus 10 via the radio transmission path, to the signal extraction unit 106.

(iii) It generates information relating to the state of the radio transmission path (i.e., transmission path state information) between the present apparatus and another communication apparatus 10, and informs the transmission path monitoring unit 107 of the information.

(iv) It performs control for the radio communication (e.g., control of the level of the transmission signal or line switching processing) based on a control signal received from the transmission path controlling unit 108.

The above transmission path state information may indicate the level of a received signal or the trouble state of the transmission path. When the radio communication between the communication apparatuses 10 employs error correction codes, the transmission path state information may include an error rate.

The signal extraction unit 106 extracts, from the signal received by the radio sending and receiving unit 105 (i.e., received signal), individual signals assigned to the user line, the management line, and the network monitoring line, and outputs the signals to the corresponding processing unit 101 to 103.

The transmission path monitoring unit 107 monitors the transmission path state information received from the radio sending and receiving unit 105. When the transmission path state information indicates a predetermined state, the transmission path monitoring unit 107 generates "apparatus alarm information" which contains an alarm and transmission path state information relating to the alarm.

For example, if the level of the received signal, which is contained in the transmission path state information, is lower than a predetermined threshold, the transmission path monitoring unit 107 generates the apparatus alarm information which includes (i) an alarm for the degradation in the transmission path and (ii) level information about the received signal. The transmission path monitoring unit 107 outputs the apparatus alarm information to the transmission path controlling unit 108, the alarm display unit 109, and the network monitoring line processing unit 103.

The transmission path monitoring unit 107 has a log storage unit 1071, and stores the transmission path state information (received from the radio sending and receiving unit 105) into the log storage unit 1071 regardless of whether or not the license has expired. Below, the information stored in the log storage unit 1071 is called "log information".

Based on the apparatus alarm information received from the transmission path monitoring unit 107, the transmission path controlling unit 108 generates a control signal used for controlling the radio transmission path (e.g., for control of the transmission signal level or line switching processing), and outputs the control signal to the radio sending and receiving unit 105.

The transmission path controlling unit 108 receives the apparatus alarm information from the transmission path monitoring unit 107 and sends the control signal to the radio sending and receiving unit 105, not via any of the first function limitation unit 121, the second function limitation unit 122, or the third function limitation unit 123.

Therefore, even when first function limitation unit 121, the second function limitation unit 122, and the third function limitation unit 123 performs signal disconnection due to the expiration of the relevant license, the transmission path controlling unit 108 can normally operate based on the apparatus alarm information received from the transmission path monitoring unit 107 and continue the control of the radio sending and receiving unit 105.

Based on the apparatus alarm information received from the transmission path monitoring unit 107, the alarm display unit 109 displays the alarm and the transmission path state information relating to the alarm, for an entrepreneur who manages the mobile communication system and the base station communication system 1 (below, simply called the entrepreneur).

The entrepreneur can detect the occurrence of the abnormal state by the alarm displayed on the alarm display unit 109, and can recognize the cause of the abnormal state by the transmission path state information displayed on the alarm display unit 109

The apparatus setting unit 110 performs various settings of the present apparatus based on an apparatus setting signal output from an information processing terminal (called "local terminal") which is directly connected to the present apparatus, or a control signal addressed to the present apparatus, which is received from the network monitoring line processing unit 103. The apparatus setting unit 110 also generates a signal relating to the settings for the transmission and reception by the radio sending and receiving unit 105, and outputs the generated signal to the transmission path controlling unit 108.

Additionally, based on a setting limitation signal output from the license period monitoring unit 112, the apparatus setting unit 110 puts limitations on each function of the present apparatus.

For example, when the setting limitation signal output from the license period monitoring unit 112 indicates no storage of the transmission path state information, the apparatus setting unit 110 sets (commands) the transmission path monitoring unit 107 not to store the transmission path state information. In such a case, the transmission path monitoring unit 107 does not store the transmission path state information in accordance with the relevant setting.

The target function for the limitation is not limited to the storage of the transmission path state information, and any appropriate function may be a target for the limitation.

The license information storage unit 111 is implement by an internal memory which cannot be detached and attached, a detachable memory card, or the like, and stores license information set for each communication apparatus 10.

The license information includes a license type and period information. The license type indicates each function which can be used according to the relevant license, among the functions of the present apparatus, and the period information indicates the period during which the license is effective.

The license information storage unit 111 may store a plurality of license information items. In such a case, license information item may have individual period information.

The license information stored by the license information storage unit 111 is updated by rewriting it by the entrepreneur or the like.

The rewriting of the license may be performed by downloading new license information via a network or replacing the detachable memory card with a card which stores new license information. Any existing method may be used for the rewriting.

The license period monitoring unit 112 receives the license information from the license information storage unit 111, and monitors the license type and the period information.

When the license period has expired, the license period monitoring unit 112 generates a function limitation signal, and outputs it to the first function limitation unit 121 to the third function limitation unit 123.

When the license period monitoring unit 112 detects renewal of the license (i.e., within the period), it stops outputting the function limitation signal and outputs a release signal to the first function limitation unit 121 to the third function limitation unit 123.

The terminal connection unit 113 is implemented using a connector for connecting cables, or the like, and is an interface for connecting a local terminal to the present apparatus.

The first function limitation unit 121 is provided among the management line processing unit 102, the signal multiplexing unit 104, and the signal extraction unit 106, and limits, inputting and outputting of the management signal by the management line processing unit 102, based on the function limitation signal output from the license period monitoring unit 112.

More specifically, when receiving the function limitation signal, the first function limitation unit 121 disconnects the management signal output from the management line processing unit 102 to the signal multiplexing unit 104, and the management signal output from the signal extraction unit 106 to the management line processing unit 102.

When the first function limitation unit 121 receives no function limitation signal or receives the release signal, the first function limitation unit 121 does not disconnect the management signal output from the management line processing unit 102 to the signal multiplexing unit 104, and the management signal output from the signal extraction unit 106 to the management line processing unit 102.

The second function limitation unit 122 is provided among the apparatus setting unit 110, the network monitoring line processing unit 103, and the terminal connection unit 113, and limits inputting of a signal into the apparatus setting unit 110, based on the function limitation signal output from the license period monitoring unit 112.

More specifically, when receiving the function limitation signal, the second function limitation unit 122 disconnects the control signal output from the network monitoring line processing unit 103 to the apparatus setting unit 110, and the apparatus setting signal output from the terminal connection unit 113 to the apparatus setting unit 110.

When the second function limitation unit 122 receives no function limitation signal or receives the release signal, the second function limitation unit 122 does not disconnect the control signal output from the network monitoring line processing unit 103 to the apparatus setting unit 110, and the apparatus setting signal output from the terminal connection unit 113 to the apparatus setting unit 110.

The third function limitation unit 123 is provided among the transmission path monitoring unit 107, the network monitoring line processing unit 103, and the alarm display unit 109, and the terminal connection unit 113, and limits outputting of a signal from the transmission path monitoring unit 107, based on the function limitation signal output from the license period monitoring unit 112.

More specifically, when receiving the function limitation signal, the third function limitation unit 123 disconnects the signal of the apparatus alarm information output from the transmission path monitoring unit 107 to the network monitoring line processing unit 103 and the alarm display unit 109, and the signal of the log information output from the transmission path monitoring unit 107 to the terminal connection unit 113.

When the third function limitation unit 123 receives no function limitation signal or receives the release signal, the third function limitation unit 123 does not disconnect the signal of the apparatus alarm information output from the transmission path monitoring unit 107 to the network monitoring line processing unit 103 and the alarm display unit 109, and the signal of the log information output from the transmission path monitoring unit 107 to the terminal connection unit 113.

Figure 3:
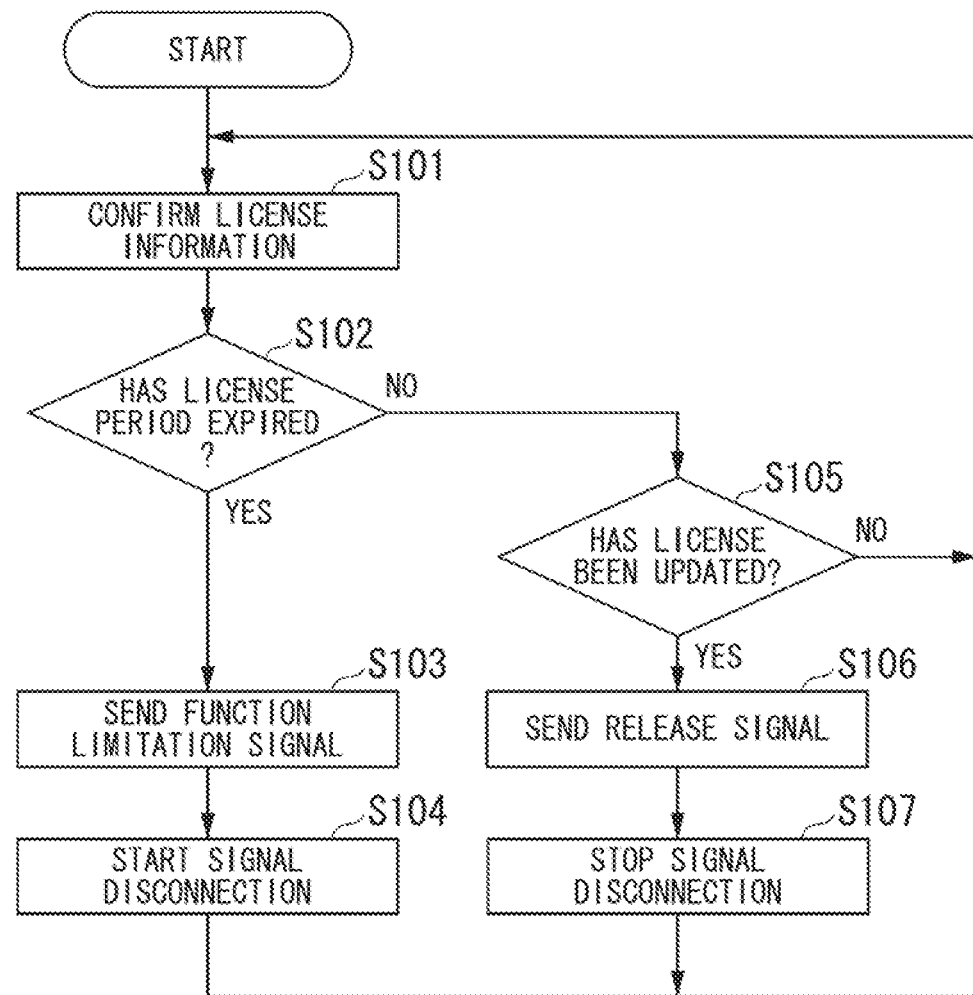
FIG. 3 is a flowchart showing the operation relating to the license, among the operations of the communication apparatus.

FIG. 3 is a flowchart showing the operation relating to the license, among the operations of the communication apparatus 10.

First, the license period monitoring unit 112 confirms the license information (see step S101). Specifically, the license period monitoring unit 112 confirms whether or not the license period has expired (see step S102).

If the license period has expired (i.e., "YES" in step S102), the management line processing unit 102 sends the function limitation signal to each of the first function limitation unit 121 to the third function limitation unit 123 (see step S103).

When the first function limitation unit 121 to the third function limitation unit 123 each receive the function limitation signal, the following functions are limited, such as a management line communication function (for the entrepreneur to perform telephone or data communication via the management line); an apparatus setting function (for the apparatus setting unit 110 to perform the settings for the present apparatus or the transmission path based on the apparatus setting signal or the control signal); an alarming function (for the alarm display unit 109 to output the alarm and the transmission path state information relating to the alarm), and a log outputting function (for the local terminal to display the transmission path state information (stored in the log storage unit 1071) via the terminal connection unit 113).

As described above, when the license period has expired, the functions of the communication apparatus 10 (for the entrepreneur) can be limited without affecting the user signal.

When the first function limitation unit 121 to the third function limitation unit 123 each receive the function limitation signal, they start disconnecting of the relevant signals (see step S104). After that, the communication apparatus 10 iterates the operation from step S101.

In the above step S102, when the license period has not yet expired (i.e., "NO" in S102), the license period monitoring unit 112 further confirms whether or not the license has been updated (see step S105).

If the license has been updated ("YES" in step S105), the license period monitoring unit 112 sends the release signal to each of the first function limitation unit 121 to the third function limitation unit 123 (see step S106).

When receiving the release signal, the first function limitation unit 121 to the third function limitation unit 123 stop the disconnection of the relevant signals (see step S107). After that, the communication apparatus 10 iterates the operation from step S101.

In the above step S105, when the license has not been updated ("NO" in S105), the communication apparatus 10 also iterates the operation from step S101.

In the communication apparatus 10 having the structure as described above, each function limitation unit (i.e., the first function limitation unit 121 to the third function limitation unit 123) and the license period monitoring unit 112 are provided, and predetermined signals flowing through the corresponding circuits in the communication apparatus 10 can be disconnected in accordance with the expiration of the license period. Therefore, the manufacturer or seller of the communication apparatus 10 can effectively apply a charge corresponding to the license, to the user (or entrepreneur) of the communication apparatus 10.

In addition, no function limitation unit is applied to each circuit through which the user signal passes. Therefore, even when the license period has expired, the user signal is not disconnected. Accordingly, even when the license period of the communication apparatus 10 has expired, the mobile station apparatus MS can perform telephone or data communication via the base transfer station 20 and the radio network controller 30, similar to the ordinary state.

When the license period has expired, the following states appear.

(i) Since the first function limitation unit 121 disconnects the inputting and outputting of the management signal, the entrepreneur cannot perform telephone or data communication by using the management signal and the management communication apparatus 50.

(ii) Since the second function limitation unit 122 disconnects the inputting of the signal into the apparatus setting unit 110, it is impossible to change the settings of the communication apparatus 10 by means of a remote operation using the central monitoring apparatus 60 or a local operation using the local terminal.

(iii) Since the third function limitation unit 123 disconnects the outputting of the signal from the transmission path monitoring unit 107, it is impossible to obtain the alarm and the transmission path state information relating to the alarm by means of the alarm display unit 109, and it is also impossible to confirm the log information by means of the local terminal.

As described above, the communication apparatus 10 makes it possible to limit the relevant functions provided for the manager (or entrepreneur) of the communication apparatus 10 in accordance with the expiration of the license, without affecting the user of the mobile station apparatus MS (i.e., end user).

In the communication apparatus 10, regardless of whether or not the license period has expired, the transmission path monitoring unit 107 stores the transmission path state information into the log storage unit 1071, so that the log information is continuously accumulated. Therefore, even if the license period has temporarily expired, when the license is updated afterwards, the entrepreneur can refer to the past log information for the period while the license has expired.

When the first function limitation unit 121, the second function limitation unit 122, and the third function limitation unit 123 are each implemented in a hardware form, the target signals flowing through the relevant circuits in the communication apparatus 10 are physically disconnected, and thus it is difficult to illegally transmit the disconnected signals in spite of the license expiration.

The license period monitoring unit 112 of the communication apparatus 10 may be implemented by executing a license period monitoring program which is non-rewritably stored in a ROM built in the communication apparatus 10.

In such a case of implementing the license period monitoring unit 112 as a function of a firmware resource, it is difficult to illegally stop the outputting of the function limitation signal in spite of the license expiration, or to illegally output the release signal in spite of no updating of the license.

In addition, the transmission path controlling unit 108 receives the apparatus alarm information (used for maintaining the transmission of the user signal) from the transmission path monitoring unit 107 and sends the control signal to the radio sending and receiving unit 105, not via any of the first function limitation unit 121, the second function limitation unit 122, and the third function limitation unit 123.

Therefore, even when the function limitation units 121 to 123 are executing the signal disconnection according to the license expiration, the transmission path controlling unit 108 can normally operate based on the apparatus alarm information received from the transmission path monitoring unit 107 and can continue the control of the radio sending and receiving unit 105.

Variation

In the above explanation, the communication apparatus 10 is used in the base station communication system 1 of the mobile communication system. However, the base station communication system 1 is only an example of the system to which the communication apparatus 10 can be applied. That is, the communication apparatus 10 may be applied to any communication system such as a communication system for implementing a dedicated line for an enterprise or a communication system for implementing a fixed line for an entrepreneur who handles communication.

In any case, the user signal is a signal required when an end user performs communication, and the specific form of the user signal depends on each system to which the communication apparatus 10 is applied.

For example, for a communication path formed using multiple communication apparatuses 10, the user signal may be a signal required for maintaining the communication between the apparatuses connected to both ends of the transmission path is a user signal, or a signal communicated by an end user.

Figure 4:
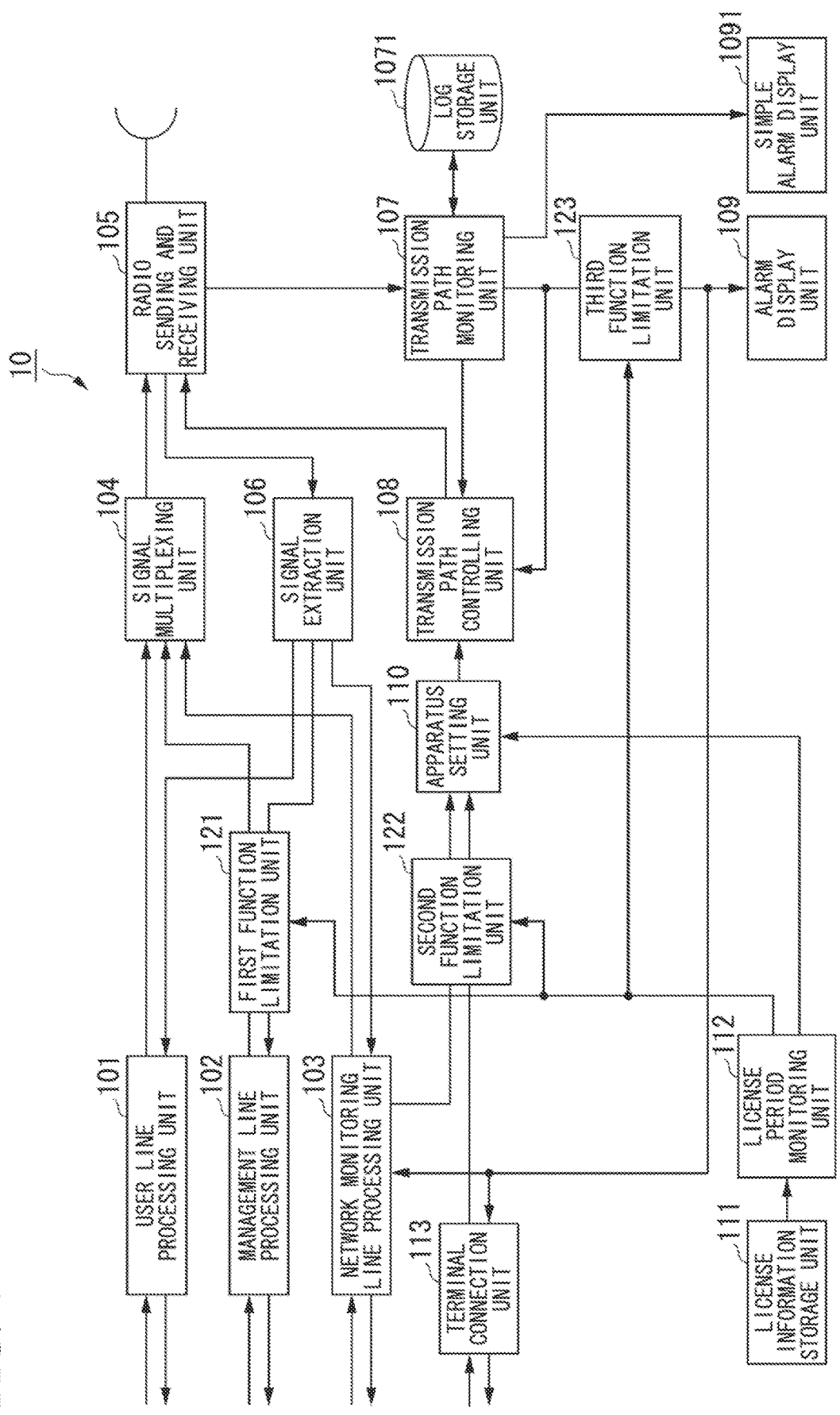
FIG. 4 is a general block diagram showing the functional structure of a variation of the communication apparatus.

FIG. 4 is a general block diagram showing the functional structure of a variation of the communication apparatus 10.

The communication apparatus 10 as the variation further includes a simple alarm display unit 1091.

In comparison with the alarm display unit 109, the simple alarm display unit 1091 displays only the alarm, and thus does not display the transmission path state information relating to the alarm. In addition, the simple alarm display unit 1091 directly receives the alarm from the transmission path monitoring unit 107, not via the third function limitation unit 123.

Therefore, in the communication apparatus 10 having the structure shown in FIG. 4, even if the license period has expired, the entrepreneur can detect the occurrence of an abnormal state by means of the simple alarm display unit 1091. However, in this case, the entrepreneur cannot refer to the transmission path state information relating to the alarm, and thus it is difficult for the entrepreneur to handle the abnormal state.

In accordance with predetermined ranks for the abnormal state, the transmission path monitoring unit 107 determines the rank assigned to an occurring abnormal state. If an abnormal state having a predetermined high degree of seriousness has occurred, the apparatus alarm information may be directly output to the alarm display unit 109 not via the third function limitation unit 123. In addition, the third function limitation unit 123 may perform the above determination based on the abnormal state ranks. In such a case, if an abnormal state having a predetermined high degree of seriousness has occurred, it is possible that the third function limitation unit 123 does not block out the apparatus alarm information from the transmission path monitoring unit 107 so that the information reaches the alarm display unit 109.

In the communication apparatus 10 having the above-described structure, the entrepreneur cannot have the apparatus alarm information about an abnormal state having a relatively low degree of seriousness and thus it is difficult for the entrepreneur to manage the abnormal state. However, if an abnormal state has occurred, which has a high degree of seriousness by which the user signal cannot be communicated, then the entrepreneur can appropriately handle the abnormal state by examining the apparatus alarm information.

Accordingly, it is possible to more effectively prevent the expired license from affecting the user of the relevant mobile station apparatus MS (i.e., end user).

In addition, if an abnormal state having a predetermined high degree of seriousness has occurred, the transmission path monitoring unit 107 as arranged above may output the relevant information to the simple alarm display unit 1091.

When the license has expired, the license period monitoring unit 112 may output information about the expiration of the license and information relating to the license by means of letters, images, or voices so as to communicate such information to the user of the communication apparatus 10 (i.e., entrepreneur).

Although the communication apparatus 10 performs radio communication using the radio sending and receiving unit 105 in the above explanation, the communication apparatus 10 may be configured to perform cable communication using a cable (communication) sending and receiving unit instead of the radio sending and receiving unit 105.

Additionally, in the above explanation, when the license is expired, the license period monitoring unit 112 sends the function limitation signal to each of the first function limitation unit 121 to the third function limitation unit 123. However, the license period monitoring unit 112 may send the function limitation signal to part of the first function limitation units.

While embodiments of the present invention have been described in detail with reference to the drawings, specific structures are not limited to the embodiments. Various design modifications or the like can be made without departing from the scope of the present invention.

INDUSTRIAL APPLICABILITY

In accordance with the present invention, in a communication apparatus that transmits a user signal required for an end user to perform communication, it is possible to limit a function of the apparatus when a relevant license has expired, while preventing an influence of the limitation upon the end user.

REFERENCE SYMBOLS 1 base station communication system
20 base transfer station
30 radio network controller
101 user line processing unit (user signal transmission unit)
102 management line processing unit
103 network monitoring line processing unit
104 signal multiplexing unit
105 radio sending and receiving unit
106 signal extraction unit
107 transmission path monitoring unit
1071 log storage unit
108 transmission path controlling unit
109 alarm display unit
1091 simple alarm display unit
110 apparatus setting unit
111 license information storage unit
112 license period monitoring unit
113 terminal connection unit
121 first function limitation unit
122 second function limitation unit
123 third function limitation unit
40 monitored apparatus
50 management communication apparatus
60 central monitoring apparatus

The invention claimed is:

1. An apparatus comprising:
a transmitter configured to transmit a signal;
a receiver configured to receive first information comprising license information related to functions of the apparatus;
a hardware monitor configured to monitor whether or not the license has expired; and
a controller configured to control settings of the transmitter,
wherein the transmitter is further configured to transmit the signal when the license has expired, and
wherein the controller is further configured to limit control of the settings of the transmitter when the license has expired.

2. The apparatus according to claim 1, wherein the apparatus is further configured to indicate expiration of the license when the license has expired.

3. The apparatus according to claim 2, wherein the expiration of the license is indicated by letters, images or voices.

4. A method for controlling an apparatus comprising:
transmitting a signal;
receiving first information comprising license information related to functions of the apparatus;
monitoring whether or not the license has expired;
controlling settings of the transmitting; and
limiting control of the settings of the transmitting when the license has expired,
wherein the transmitting the signal is performed when the license has expired.

5. The method according to claim 4, further comprising indicating expiration of the license when the license has expired.

6. The method according to claim 5, wherein the expiration of the license is indicated by letters, images or voices.

* * * * *